2,857,371

BENZOTHIAZOLE AZO DIPHENYLAMINE COMPOUNDS

James M. Straley and John G. Fisher, Kingsport, Tenn., assignors to Eastman Kodak Company, Rochester, N. Y., a corporation of New Jersey No Drawing. Application September 10, 1954
Serial No. 455,364

18 Claims. (Cl. 260—146)

This invention relates to new azo compounds and their application to the art of dyeing or coloring. More particularly it relates to certain metallized and non-metallized benzothiazoleazodiphenylamine compounds and their application to the dyeing of various textile materials. Insofar as dyeing is concerned the invention is particularly directed to the dyeing of cellulose acetate textile materials with the metallized azo compounds of the invention.

The non-metallized monoazo compounds or our invention have the formula:

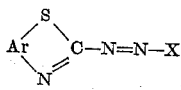

wherein Ar represents an ortho-arylene radical of the benzene series and X represents a diphenylamine radical joined through the carbon atom in its 4-position to the azo bond shown and which contains a hydroxy group, a methoxy group, an ethoxy group, a propoxy group, a butoxy group or a β-hydroxyethoxy group joined to the carbon atom in its 3-position. When these azo compounds are treated with salts of nickel, cobalt, copper, chromium, manganese, iron or vanadium, complexes of the azo compounds with these metals are formed. The complex monoazo compounds formed constitute the metallized monoazo compounds of our invention. The manner of preparing the non-metallized and metallized azo compounds of our invention is fully described hereinafter.

While our invention relates broadly to the non-metallized and the metallized monazo compounds just described, the azo compounds of our invention are represented for the most part by the non-metallized and the metallized forms of the azo compounds having the formula:

wherein Ar represents an ortho-arylene radical of the benzene series which is either unsubstituted or is substituted with an alkylsulfonyl group having 1 to 4, inclusive, carbon atoms, an N-alkylsulfonamide group having 1 to 4, inclusive, carbon atoms, an alkoxy group having 1 to 4, inclusive, carbon atoms, an alkyl group having 1 to 4, inclusive, carbon atoms, a hydroxyalkyl group having 2 to 4, inclusive, carbon atoms, an acetylamino group, a propionylamino group, a butyrylamino group, a thiomethyl group, a thiocyano group, a cyano group, a trifluoromethyl group, a chlorine atom or a nitro group, R represents a hydrogen atom, an alkyl group having 1 to 4, inclusive, carbon atoms or a β-hydroxyethyl group, R₁ represents a hydrogen atom, a hydroxyalkyl group having 2 to 4, inclusive, carbon atoms, an alkyl group having 1 to 4, inclusive, carbon atoms or a cyanoalkyl group having 3 to 4, inclusive, carbon atoms and R₂ represents a hydrogen atom, a hydroxy group, an alkoxy group having 1 to 4, inclusive, carbon atoms, an alkyl group having 1 to 4, inclusive, carbon atoms or a chlorine atom.

As is well known, one of the disadvantages dyed cellulose acetate textile fabrics suffer in comparison with some of the dyed competing textile fabrics, such as cotton, wool and viscose, for example, is lack of fastness to washing. Many schemes have been proposed to remedy this situation but all suffer from some significant fault. By means of our invention dyed cellulose acetate textile materials having good to excellent fastness to washing, light and gas are obtainable. These results may be obtained by dyeing the cellulose acetate textile material with the non-metallized dye compounds of the invention and then treating the dyed cellulose acetate textile material with suitable metal salts which cause the original dye to form metallic complexes which are resistant, for example, to the action of washing, light and gas. Thus, by means of the present invention, the disadvantage noted above with respect to the wash fastness of dyed cellulose acetate textile materials is either entirely or largely overcome.

While reference has been made to the dyeing of cellulose acetate textile materials, it is to be understood that the invention is generally applicable to the dyeing of textile materials made of or containing a cellulose alkyl carboxylic acid ester having two to four carbon atoms in the acid groups thereof. Cellulose acetate has been particularly referred to because it is the most widely used cellulose alkyl carboxylic acid ester.

The non-metallized monoazo compounds of our invention are prepared by diazotizing a 2-aminobenzothiazole compound having the formula:

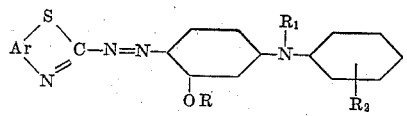

wherein Ar represents an ortho-arylene radical of the benzene series and coupling the diazonium compound obtained with a diphenylamine compound which contains a hydroxy group, a methoxy group, an ethoxy group, a propoxy group, a butoxy group or a β-hydroxyethoxy group joined to the carbon atom in its 3-position. These compounds in addition to being dyes for various materials identified herein possess the important property of being metallizable. The metallized dyes formed therefrom have the valuable properties described herein.

The metallized monoazo compounds of our invention are prepared by treating the non-metallized azo compounds with salts of nickel, cobalt, copper, chromium, manganese, iron or vanadium. The non-metallized monoazo compounds can be metallized either on or off the fiber. Metallization can be carried out, for example, by treating the non-metallized dye with a solution or dispersion of the metallizing agent. Although the metal complex is often formed at room temperature, we prefer to accelerate the process by heating, usually with steam, for a short time. Examples of how the non-metallized monoazo compounds of our invention can be metallized satisfactorily are given hereinafter.

When the non-metallized azo compounds of our invention are used to dye nylon, an acrylonitrile polymer, such as polyacrylonitrile and acrylonitrile graft polymers, and a polyester, such as polyethylene terephthalate, textile materials the fastness to light of the dyeing is frequently improved. That is, the metallized dyeing on the materials is frequently faster to light than the corresponding non-metallized dyeing.

Illustrative of the metallizing agents that can be employed are the halides, the sulfates, the acetates, the cyanides and the thiocyanates of nickel, cobalt, chromium, manganese, iron and vanadium as well as various copper compounds. Thus, nickel chloride, nickel bromide, nickel sulfate, nickel acetate, nickel cyanide, nickel formate, nickel thiocyanate [Ni(SCN)₂], cobaltous acetate, cobaltic chloride, cobaltous chloride, cobaltous acetate, cobaltous cyanide, cobalt thiocyanate [Co(SCN)₂], cupric chloride, cupric bromide, cupric acetate, cupric lactate, chromium trichloride, chromium tribromide, chromic sulfate, chromic acetate, chromium thiocyanate [Cr(SCN)₃], manganese chloride, manganous sulfate, manganese acetate, manganese thiocyanate [Mn(SCN)₂], ferric chloride, ferric fluoride, ferrous acetate, ferrous thiocyanate [Fe(SCN)₂], ferric thiocyanate [Fe(SCN)₃] and vanadium thiocyanate, are illustrative of the metallizing agents that can be employed.

When the metal complex is formed on a cellulose alkyl carboxylic acid ester, such as cellulose acetate, fiber the use of a metal thiocyanate appears to be advantageous and is preferred. Nickel thiocyanate appears to be especially useful and particular claim is laid to its use. Next to nickel thiocyanate the use of cobalt thiocyanate is preferred.

2 - amino - 6 - methylsulfonylbenzothiazole, 2 - amino-6-ethylsulfonylbenzothiazole, 2-amino-6-n-propylsulfonyl-benzothiazole, 2-amino-6-n-butylsulfonylbenzothiazole, 2-aminobenzothiazole - 6 - N-methylsulfonamide, 2 - amino-benzothiazole-6-N-ethylsulfonamide, 2-aminobenzothiazole-6-N-n-propylsulfonamide, 2-aminobenzothiazole-6-N-n-butylsulfonamide, 2-amino-6-methoxybenzothiazole, 2 - amino - 6 - ethoxybenzothiazole, 2 - amino - 6 - n-propoxybenzothiazole, 2-amino-6-n-butoxybenzothiazole, 2-amino-6-methylbenzothiazole, 2-amino-6-ethylbenzothiazole, 2-amino-6-n-propylbenzothiazole, 2-amino-6-n-butylbenzothiazole, 2-amino-6-β-hydroxyethylbenzothiazole, 2-amino-6-γ-hydroxypropylbenzothiazole, 2-amino-6-δ-hydroxybutylbenzothiazole, 2-amino-6-acetyl-aminobenzothiazole, 2-amino-6-n-propionylaminobenzothiazole, 2-amino-6-n-butyrylaminobenzothiazole, 2-amino - 6 - thiomethylbenzothiazole, 2-amino-6-thiocyano benzothiazole, 2-amino-6-cyanobenzothiazole, 2-amino-6-trifluoromethylbenzothiazole, 2-amino-6-chlorobenzothiazole, 2-amino-6-nitrobenzothiazole, 2-amino-4,7-dimethoxybenzothiazole, 2-amino-5,6-dimethoxybenzothiazole, 2-amino-4,7-diethoxybenzothiazole, and 2-amino-4,6-dimethylbenzothiazole are representative of the 2-aminobenzothiazole compounds used in the preparation of the azo compounds of our invention.

3 - hydroxy - 4′ - methoxy-diphenylamine, 3 - hydroxy - 4′-ethoxydiphenylamine, 3-hydroxy - 4′ - n - propoxydiphenylamine, 3-hydroxy-4′-iso-propoxydiphenylamine, 3-hydroxy-4′-n-butoxydiphenyl-amine, 3-hydroxy-4′-methyldiphenylamine, 3-hydroxy-3′-methyldiphenylamine, 3-hydroxy-4′-ethyldiphenylamine, 3-hydroxy-4′-n-butyldiphenylamine, 3-hydroxy-2′-chloro-diphenylamine, 3-hydroxy-3′-chlorodiphenylamine, N-methyl-3-methoxydiphenylamine, N-ethyl-3-methoxydi-phenylamine, N-n-propyl-3-methoxydiphenylamine, N-n-butyl-3-methoxydiphenylamine, 3-methoxydiphenylamine, 3-ethoxydiphenylamine, 3-n-propoxydiphenylamine, 3-n-butoxydiphenylamine, 3-isopropoxydiphenylamine, 3-β-hydroxyethoxy-N-β-hydroxyethyldiphenylamine, 3-β-hy-droxyethoxy - N - β - hydroxyethyl - 4′ - methoxydiphenyl-amine, 3-β-hydroxyethoxy-N-β-hydroxyethyl-2′-chloro-diphenylamine, 3-methoxy-N-γ-hydroxypropyldiphenyl-amine, 3-hydroxy-N-β-hydroxyethyldiphenylamine, 3-hydroxy-N-γ-hydroxypropyldiphenylamine, 3-methoxy-N-β-hydroxyethyldiphenylamine, 3-hydroxy-2-methoxy-diphenylamine, 3-hydroxy-2′-methyldiphenylamine, 3-hydroxy-2′-methoxy-N-β-hydroxyethyldiphenylamine, 3-methoxy-N-δ-hydroxybutyldiphenylamine, 3-hydroxy-N-β-hydroxyethyl-2′-chlorodiphenylamine, 3-hydroxy-N-β-cyanoethyldiphenylamine, 3-methoxy-N-β-cyanoethyldi-phenylamine, 3-hydroxy-2′-methoxy-N-β-hydroxyethyldi-phenylamine, 3-hydroxy-2′-chloro-N-β-hydroxyethyldi-phenylamine, 3-n-butoxy-N-β-hydroxyethyldiphenylamine, 3-hydroxy-N-γ-cyanopropyldiphenylamine and 3-methoxy-N-γ-cyanopropyldiphenylamine, for example, are illustrative of the diphenylamine compounds used in the preparation of the azo compounds of our invention.

The non-metallized monoazo dye compounds of our invention are useful for the dyeing of cellulose alkyl carboxylic acid esters having two to four carbon atoms in the acid groups thereof, nylon, acrylonitrile polymers, such as polyacrylonitrile and acrylonitrile graft polymers, and polyesters, such as polyethylene terephthalate. After application to these materials, usually in the form of textile materials, the dye may be metallized thereon, if desired. The metallized azo compounds of our invention can be applied by ordinary dyeing or printing techniques to nitrogenous textile materials such as wool, silk, nylon and acrylonitrile polymers, for example. Coloration can also be effected by incorporating the non-metallized or metallized azo compounds into the spinning dope, spinning the fiber as usual and converting the non-metallized azo compounds to their metallized form if desired. Also the metallizing agent can be incorporated in the spinning dope, the fiber spun as usual and then dyed with the non-metallized monoazo compounds to form the metal complex on the fiber. The new metallized dyes of our invention are preferably formed by heating the non-metallized azo dye with the metallizing agent in organic solvents such as, for example, cellulose acetate, cellulose acetate-propionate, acrylonitrile polymers, polyamides, methyl Cellosolve and formamide.

The non-metallized monoazo compounds are dyes for fibers prepared from graft polymers obtained by graft polymerizing acrylonitrile alone or together with one or more other monoethylenic monomers with a preformed polymer. The preformed polymer can be a homopolymer (a polymer prepared by polymerization of a single monomer) or it can be an interpolymer such as a copolymer (a polymer prepared by the simultaneous polymerization in a single reaction mixture of two monomers) or a terpolymer (a polymer prepared by the simultaneous polymerization in a single reaction mixture of three monomers), or the like, and the graft polymers for which the non-metallized dyes are particularly useful are those containing at least 5% by weight of combined acrylonitrile grafted to the preformed polymer molecule.

The graft polymers which can be dyed using the non-metallized dyes are thus polymers having directed placement of the polymerized monomeric units in the graft polymer molecule as distinguished from the random distribution obtained in interpolymers which are prepared by simultaneous polymerization of all of the monomeric materials in the polymer. The preformed polymer can be either a homopolymer of any of the well-known polymerizable monomers containing a single —CH=C< group and desirably a CH₂=C< group, or an interpolymer of two or more of such monomers; and the grafting can be effected with the preformed homopolymer or inter-polymer in the polymerization mixture in which it was formed (i. e. a live polymer) or with the preformed polymer isolated from the polymerization mixture in which it was formed (i. e. a dead polymer).

The preformed polymer desirably is a homopolymer of a vinyl pyridine, an acrylamide, a maleamide, a fumaramide, an acrylate, a methacrylamide, a methacrylate, an itaconamide, a citraconamide, a fumaramate, an itaconamate, a citraconamate, a maleamate, or a vinyl ester; or an interpolymer of two or more of such monomers with each other or of at least one of such monomers with one or more different monoethylenic monomers characterized by a —CH=C< group such as styrene, acrylonitrile, substituted styrenes, vinyl or vinylidene chlorides, vinyl ethers, dialkyl maleates, alkenyl ketones, dialkyl fumarates, acrylic acid, methacrylic acid, substituted acrylonitriles, fumaronitrile, ethylene and the like.

The graft polymerization is effected by polymerizing acrylonitrile or a mixture of acrylonitrile with any other monoethylenic monomer, including any of the monomers enumerated hereinabove, with the preformed live or dead homopolymer or interpolymer whereby the acrylonitrile alone or together with another grafting monomer is combined with the preformed polymer molecule to give a graft polymer containing from 5 to 95% by weight of combined acrylonitrile.

The new non-metallized azo compounds of our invention are of particular utility for dyeing fibers prepared from a graft polymer obtained by graft polymerizing acrylonitrile and an acrylamide or methacrylamide with a preformed copolymer of acrylonitrile and the same or different acrylamide or methacrylamide.

U. S. Patent 2,620,324, issued December 2, 1952; U. S. Patent 2,649,434, issued August 18, 1953; and U. S. Patent 2,657,191, issued October 27, 1953, disclose other typical graft polymers that can be dyed with the new non-metallized azo compounds of our invention.

By cellulose alkyl carboxylic acid esters having two to four carbon atoms in the acid groups thereof, we mean to include, for example, both hydrolyzed and unhydrolyzed cellulose acetate, cellulose proprionate, cellulose butyrate, cellulose acetate-propionate and cellulose acetate-butyrate.

The following examples in which parts are expressed by weight illustrate our invention:

EXAMPLE 1

212 parts of concentrated sulfuric acid (94%) were added to a slurry of 34.2 parts of 2-amino-6-methylsulfonylbenzothiazole in 356 parts of water. The solid dissolves as the temperature rises. The resulting solution was cooled to −10° C. and a solution prepared by dissolving 12.6 parts of sodium nitrite in 137 parts of concentrated sulfuric acid was added while maintaining the temperature of the reaction mixture below −5° C. After complete addition of the sodium nitrite, the reaction mixture was stirred for 2 hours at 0° C. or slightly below. The diazonium solution of 2-amino-6-methylsulfonylbenzothiazole thus formed was added, with stirring, to a solution of 3-hydroxydiphenylamine in 375 parts of 27.75 parts of propionic-acetic (1:5) acids at 0° C. The reaction mixture was then stirred 1 hour longer and then drowned in 6000 parts of water. The dye compound which precipitated was recovered by filtration, washed with water until neutral and dried under vacuum at 60° C. 55.2 parts of a dye compound having the formula:

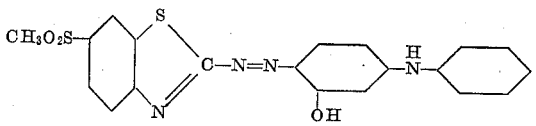

were obtained as a red solid. It dyes cellulose acetate, nylon and polyacrylonitrile containing 18% N-methylmethacrylamide red shades.

EXAMPLE 2

A solution of 3.8 parts of sodium nitrite in 45 parts of concentrated sulfuric acid was added, with stirring, to a solution of 12.85 parts of 2-amino-benzothiazole-6-N-ethylsulfonamide in 120 parts of 60% aqueous sulfuric acid. The reaction mixture thus formed was stirred for 1 hour at 0° C. and then run into a solution of 10.8 parts of 3-hydroxy-4'-methoxydiphenylamine in 150 parts of propionic-acetic (1:5) acids at 0° C. The reaction mixture was then made neutral to Congo red paper by the addition of ammonium acetate, stirred for 2 hours and then drowned in 1500 parts of water. The dye compound which precipitated was recovered by filtration, washed with cold water until neutral and dried at 60° C. 16 parts of a monoazo dye compound which dyes cellulose acetate, nylon and polyacrylonitrile containing 20% of isopropylacrylamide brown shades were obtained.

EXAMPLE 3

A solution of 3.8 parts of sodium nitrite in 45 parts of concentrated sulfuric acid was added, with stirring, at 0° C. to a solution of 11.1 parts of 2-amino-4,7-dimethoxybenzothiazole in 60 parts of propionic-acetic (1:5) acids. After stirring for 1 hour, the reaction mixture was run into a solution of 11 parts of 3-hydroxy-2'-chlorodiphenylamine in 160 parts of propionic-acetic (1:5) acids at 0° C. The reaction mixture was made neutral to Congo red paper by the addition of ammonium acetate, stirred 1.5 hours longer and then drowned in cold water. The dye compound which precipitated was recovered by filtration, washed with cold water until neutral and dried at 60° C. 17.5 parts of dye product were recovered as a red solid. It dyes cellulose acetate, nylon and polyacrylonitrile containing 18% N-methylmethacrylamide red shades.

EXAMPLE 4

A solution of 3.8 parts of sodium nitrite in 45 parts of concentrated sulfuric acid was added, with stirring, at 0° C. to a solution of 9.75 parts of 2-amino-6-nitrobenzothiazole in 60 parts of propionic-acetic (1:5) acids. After stirring for 1 hour, the reaction mixture was run into a solution of 10.5 parts of 3-hydroxy-3'-methyldiphenylamine in 160 parts of propionic-acetic (1:5) acids at 0° C. The reaction mixture was made neutral to Congo red paper by the addition of ammonium acetate, stirred 1.5 hours longer and then drowned in water. The dye compound which precipitated was recovered by filtration, washed with cold water until neutral and dried at 60° C. 15.5 parts of a dye compound which dyes cellulose acetate, nylon and polyacrylonitrile containing 20% of isopropylacrylamide bluish-red shades were obtained.

EXAMPLE 5

34.2 parts of 2-amino-6-methylsulfonylbenzothiazole were diazotized and the diazonium compound obtained was coupled with 36.45 parts of 3-methoxy-N-β-hydroxyethyldiphenylamine. Diazotization, coupling and recovery of the dye compound formed were carried out in accordance with the procedure described in Example 1. The dye compound obtained dyes cellulose acetate, nylon, polyethyleneterephthalate and polyacrylonitrile containing 18% N-methylmethacrylamide red shades.

EXAMPLE 6

34.2 parts of 2-amino-6-methylsulfonylbenzothiazole were diazotized and the diazonium compound obtained was coupled with 29.85 parts of 3-methoxydiphenylamine. Diazotization, coupling and recovery of the dye compound formed were carried out in accordance with the procedure described in Example 1. The dye compound obtained dyes cellulose acetate, nylon, polyethyleneterephthalate and polyacrylonitrile containing 18% N-methylmethacrylamide red shades.

EXAMPLE 7

27.0 parts of 2-amino-6-methoxybenzothiazole were diazotized and the diazonium compound obtained was coupled with 29.9 parts of 3-hydroxy-3'-methyldiphenylamine. Diazotization, coupling and recovery of the dye compound formed were carried out in accordance with the procedure described in Example 1. The dye compound obtained dyes cellulose acetate, nylon, polyethyleneterephthalate and polyacrylonitrile containing 18% N-methylmethacrylamide red shades.

EXAMPLE 8

22.5 parts of 2-aminobenzothiazole were diazotized and the diazonium compound obtained was coupled with 29.9 parts of 3-hydroxy-3'-methyldiphenylamine. Diazotization, coupling and recovery of the dye compound formed were carried out in accordance with the procedure described in Example 1. The dye compound obtained dyes cellulose acetate, nylon, polyethyleneterephthalate and polyacrylonitrile containing 18% N-methylmethacrylamide red shades.

EXAMPLE 9

34.2 parts of 2-amino-6-methylsulfonylbenzothiazole were diazotized and the diazonium compound obtained was coupled with 35.0 parts of 3-methoxy-2'-chlorodiphenylamine. Diazotization, coupling and recovery of the dye compound formed were carried out in accordance with the procedure described in Example 1. The dye compound obtained dyes cellulose acetate, nylon, polyethyleneterephthalate and polyacrylonitrile containing 18% N-methylmethacrylamide red shades.

EXAMPLE 10

24.6 parts of 2-amino-6-methylbenzothiazole were diazotized and the diazonium compound obtained was coupled with 32.3 parts of 3-hydroxy-4'-methoxydiphenylamine. Diazotization, coupling and recovery of the dye compound formed were carried out in accordance with the procedure described in Example 1. The dye compound obtained dyes cellulose acetate, nylon, polyethyleneterephthalate and polyacrylonitrile containing 18% N-methylmethacrylamine red shades.

EXAMPLE 11

34.2 parts of 2-amino-6-methylsulfonylbenzothiazole were diazotized and the diazonium compound obtained was coupled with 32.0 parts of 3-methoxy-4'-methyldiphenylamine. Diazotization, coupling and recovery of the dye compound formed were carried out in accordance with the procedure described in Example 1. The dye compound obtained dyes cellulose acetate, nylon, polyethyleneterephthalate and polyacrylonitrile containing 18% N-methylmethacrylamide pink shades.

EXAMPLE 12

27.0 parts of 2-amino-6-methoxybenzothiazole were diazotized and the diazonium compound obtained was coupled with 32.3 parts of 3-hydroxy-4'-methoxydiphenylamine. Diazotization, coupling and recovery of the dye compound formed were carried out in accordance with the procedure described in Example 1. The dye compound obtained dyes cellulose acetate, nylon, polyethyleneterephthalate and polyacrylonitrile containing 18% N-methylmethacrylamide pink shades.

EXAMPLE 13

270 parts of a 15% solution of nickel thiocyanate in water were added to a solution of 106 parts of the dye of Example 1 in 500 parts of the monomethyl ether of ethylene glycol. An exothermic reaction occurred and the reaction mixture was stirred 1 hour at 50° C.–60° C. after the original reaction had subsided. The reaction mixture was then drowned in 3500 parts of water and the dye compound which precipitated was recovered by filtration, washed with cold water until neutral and dried. 93 parts of a monoazo compound which is the nickel complex of the dye of Example 1 were obtained. The complex nickel compound dissolves in acetone to a violet color in contrast to the original dye which gives a scarlet coloration in acetone. When dyed as a dispersed dyestuff, this complex nickel compound dyes nylon, wool, silk and polyacrylonitrile containing 10% of 2-methyl-5-vinylpyridine violet shades.

EXAMPLE 14

137 parts of cobalt acetate (Co[O$_2$CCH$_3$]$_2$.4H$_2$O) and 56 parts of sodium carbonate were added to a solution of 212 parts of the azo dye prepared in Example 1 in 1000 parts of the monomethyl ether of ethylene glycol. The reaction mixture resulting was refluxed for 8 hours and then drowned in 10,000 parts of water. The dye compound which precipitated was recovered by filtration, washed well with water and dried under vacuum at 60° C. 230 parts of the complex cobalt compound of Example 1 were obtained as a violet solid. It dyes nylon, wool, silk and polyacrylonitrile containing 15% of N-methylmethacrylamide shades that are slightly bluer and duller than those obtained with the nickel complex of Example 13. The cobalt complex dyestuff contained 12.97% of cobalt by elementary analysis.

EXAMPLE 15

A 1% dyeing (pure dye) on a cellulose acetate textile material with the dye product of Example 1 was dried and padded with a 2% solution of nickel thiocyanate in water under such conditions that the pickup was 80–100% of the weight of the goods. The cellulose acetate textile material was dried under atmospheric conditions and then placed in a steam chamber and subjected to the action of open steam for 15–20 minutes. Following this the dyed cloth was scoured with soap and water for 20 minutes, rinsed and dried. The original color of the cellulose acetate cloth which was red was changed to a bright, deep violet. The dyeing which originally bled when subjected to an A. A. T. C. C. wash test at 120° F. now withstands an A. A. T. C. C. wash test at 160° F. with soap and water. Further, while the original red dyeing showed a definite break after 4 hours exposure in the Fade-Ometer, the finished dyeing shows only an almost imperceptible break after 20 hours exposure in the Fade-Ometer. This example shows how cellulose acetate dyed with a non-metallized monoazo dye of our invention can be metallized on the fiber to obtain a dyeing having good to excellent fastness to washing.

EXAMPLE 16

A solution of 6 parts of Cuprofix (a mixture of copper sulfate and a low urea-formaldehyde polymer) and 20 parts of Rhonite 610 (a partially polymerized urea-formaldehyde polymer) in 200 parts of water was padded on the original dyed cellulose acetate cloth of Example 15 and the padded cloth was then dried at 110° C. Following curing, the treated cloth was scoured for 5 minutes at 60° C. with a solution of 1 part sodium carbonate, 1 part sodium hexa-m-phosphate and 1 part of Triton 720 (a condensate of ethylene oxide with an alkylated phenol) in 1000 parts of water, rinsed and dried. In a variation of the above procedure Rhonite 610 was omitted and the curing step replaced by steaming for 30 minutes under 5 pounds pressure.

Brilliant violet dyeings were obtained. However, while considerable improvement, especially with respect to fastness to washing as compared to the untreated original dyeing was observed, the finished dyeings do not appear to be as resistant to light and washing as the products of Example 15.

EXAMPLE 17

To an acetone solution of yarn type cellulose acetate there was added 1% (based on the weight of cellulose acetate) by weight of chromium trichloride in very finely divided condition. After thorough and intimate dispersion of the chromium trichloride in the cellulose acetate, the dope resulting was spun into yarn by forcing it through spinnerettes into a countercurrent of warm air in the conventional manner. The resulting yarn was dyed in the usual manner with the product of Example 1 to obtain a 1% dyeing (based on pure dye) after which the yarn was dried and finally steamed 30 minutes under 5 pounds pressure. The resulting cloth showed no bleeding in an A. A. T. C. C. wash test at 160° C. using sodium carbonate and was a rather bright bordeaux shade.

EXAMPLE 18

10 parts of a cellulose acetate fabric dyed to a strength of 1% (by weight based on pure dye) with the dye of Example 1 was wetted out with soap and water and immersed in a dye bath prepared from 300 parts of water to which was added 32 parts of a 5% nickel acetate solution. The dye bath was brought from 30° C. to the boil in about 30 minutes and held at the boil 1 hour. The cellulose acetate fabric was then soaped at 80° C., rinsed and dried. By the above treatment the non-metallized dye of Example 1 was converted on the fiber to its complex nickel form. The resulting cellulose acetate textile fabric was dyed a violet shade having the fastness properties described in Example 15.

EXAMPLE 19

109.5 parts of the dye of Example 6 was metallized with nickel thiocyanate in accordance with the procedure described in Example 13. The complex nickel compound obtained dissolves in acetone to a violet color in contrast to the original dye which gives a red coloration. When dyed as a dispersed dyestuff, the complex nickel compound dyes nylon, wool, silk and polyacrylonitrile containing 10% of 2-methyl-5-vinylpyridine violet shades.

EXAMPLE 20

97.5 parts of the dye of Example 7 were metallized with nickel thiocyanate in accordance with the procedure described in Example 13. The complex nickel compound obtained dissolves in acetone to a blue color in contrast to the original dye which gives a red coloration. When dyed as a dispersed dyestuff, the complex nickel compound dyes nylon, wool, silk and polyacrylonitrile containing 10% of 2-methyl-5-vinylpyridine blue shades.

EXAMPLE 21

120.5 parts of the dye of Example 5 were metallized with nickel thiocyanate in accordance with the procedure described in Example 13. The complex nickel compound obtained dissolves in acetone to a blue color in contrast to the original dye which gives a red coloration. When dyed as a dispersed dyestuff, the complex nickel compound dyes nylon, wool, silk and polyacrylonitrile containing 10% of 2-methyl-5-vinylpyridine blue shades.

EXAMPLE 22

90 parts of the dye of Example 8 were metallized with nickel thiocyanate in accordance with the procedure described in Example 13. The complex nickel compound obtained dissolves in acetone to a blue color in contrast to the original dye which gives a red coloration. When dyed as a dispersed dyestuff, the complex nickel compound dyes nylon, wool, silk and polyacrylonitrile containing 10% of 2-methyl-5-vinylpyridine blue shades.

EXAMPLE 23

A 1% dyeing (by weight based on pure dye) on a cellulose acetate textile fabric of the dye of Example 6 was metallized with a 2% solution of nickel thiocyanate in water in accordance with the procedure described in Example 15. The color of the cellulose acetate textile fabric changes from red to violet. The wash fastness of the dyeing obtained by forming the nickel complex of the dye on the fabric is very good and is much superior to that of the original dyeing.

EXAMPLE 24

A 1% dyeing (by weight based on pure dye) on a cellulose acetate textile fabric of the dye of Example 7 was metallized with a 2% solution of nickel thiocyanate in water in accordance with the procedure described in Example 15. The color of the cellulose acetate textile fabric changes from red to blue. The wash fastness of the dyeing obtained by forming the nickel complex of the dye on the fabric is very good and is much superior to that of the original dyeing.

EXAMPLE 25

A 1% dyeing (by weight based on pure dye) on a cellulose acetate textile fabric of the dye of Example 5 was metallized with a 2% solution of nickel thiocyanate in water in accordance with the procedure described in Example 15. The color of the cellulose acetate textile fabric changes from red to blue. The wash fastness of the dyeing obtained by forming the nickel complex of the dye on the fabric is very good and is much superior to that of the original dyeing.

EXAMPLE 26

A 1% dyeing (by weight based on pure dye) on a cellulose acetate textile fabric of the dye of Example 8 was metallized with a 2% solution of nickel thiocyanate in water in accordance with the procedure described in Example 15. The color of the cellulose acetate textile fabric changes from red to blue. The wash fastness of the dyeing obtained by forming the nickel complex of the dye on the fabric is very good and is much superior to that of the original dyeing.

EXAMPLE 27

A 1% dyeing (by weight based on pure dye) on a cellulose acetate textile fabric of the dye of Example 9 was metallized with a 2% solution of nickel thiocyanate in water in accordance with the procedure described in Example 15. The color of the cellulose acetate textile fabric changes from red to violet. The wash fastness of the dyeing obtained by forming the nickel complex of the dye on the fabric is very good and is much superior to that of the original dyeing.

EXAMPLE 28

A 1% dyeing (by weight based on pure dye) on a cellulose acetate textile fabric of the dye of Example 10 was metallized with a 2% solution of nickel thiocyanate in water in accordance with the procedure described in Example 15. The color of the cellulose acetate textile fabric changes from red to violet. The wash fastness of the dyeing obtained by forming the nickel complex of the dye on the fabric is very good and is much superior to that of the original dyeing.

EXAMPLE 29

A 1% dyeing (by weight based on pure dye) on a cellulose acetate textile fabric of the dye of Example 11 was metallized with a 2% solution of nickel thiocyanate in water in accordance with the procedure described in Example 15. The color of the cellulose acetate textile fabric changes from pink to violet. The wash fastness of the dyeing obtained by forming the nickel complex of the dye on the fabric is very good and is much superior to that of the original dyeing.

EXAMPLE 30

A 1% dyeing (by weight based on pure dye) on a cellulose acetate textile fabric of the dye of Example 12 was metallized with a 2% solution of nickel thiocyanate in water in accordance with the procedure described in Example 15. The color of the cellulose acetate textile fabric changes from pink to blue. The wash fastness of the dyeing obtained by forming the nickel complex of the dye on the fabric is very good and is much superior to that of the original dyeing.

EXAMPLE 31

To a solution of 19.4 grams of 2-amino-6-β-hydroxyethylbenzothiazole in 250 grams of 50% sulfuric acid there was stirred in over a period of about 10 minutes a solution of 7.6 grams of sodium nitrite in 50 cc. of sulfuric acid (94%) while maintaining the temperature between 0° C. and 5° C. Following this the reaction mixture was stirred for 2 hours below 5° C. and then 18.5 grams of 3-hydroxydiphenylamine in 1 liter of 2% sodium hydroxide was run in below the surface of the reaction mixture at a temperature of 0° C.–5° C. The reaction mixture resulting was stirred for 2 hours at room temperature and then the mineral acid present was neutralized to Congo red paper by the addition of sodium acetate. Two liters of water were then added to the reaction mixture and the reaction product which precipitated was recovered by filtration and washed with water until neutral and then dried. 32 to 36 grams of a dye compound which dyes cellulose acetate bright red shades and the acrylonitrile graft polymer described hereinafter bright violet shades were obtained.

EXAMPLE 32

A 3% dyeing (by weight based on pure dye) of the dye of Example 31 on a cellulose acetate textile fabric was metallized with a 2% solution of nickel thiocyanate in water in accordance with the procedure described in Example 15. The color of the cellulose acetate textile fabric changed from red to a deep navy blue dyeing which has excellent resistance to the action of light and laundering agents.

The following tabulation further illustrates the monoazo compounds of our invention and sets forth the colors the nonmetallized compounds yield on (1) cellulose acetate and (2) an acrylonitrile graft polymer, as well as the colors obtained on cellulose acetate when the non-metallized compounds are metallized on the fiber. The preparation of the acrylonitrile graft polymer referred to in the tabulation is described immediately following the tabulation. "C. A." refers to cellulose acetate, "Original" refers to the non-metallized dyeing and "Final" refers to the metallized dyeing.

| 2-Aminobenzothiazole Compound | Coupling Component | Metallizing Agent | Color on CA | | Color on Acrylonitrile Graft Polymer Original |
|---|---|---|---|---|---|
| | | | Original | Final | |
| 6-Methylsulfonyl | 3-Hydroxy-4'-methoxydiphenylamine | Ni(SCN)$_2$ | red | violet | |
| Do | do | Co(SCN)$_2$ | do | do | |
| Do | do | Cr(SCN)$_3$ | do | red-violet | |
| Do | do | Mn(SCN)$_2$ | do | do | |
| Do | do | CuBr$_2$ | do | violet | |
| Do | do | Cupric lactate | do | do | |
| Do | do | Fe(SCN)$_2$ | do | brown | |
| Do | do | Fe(SCN)$_3$ | do | do | |
| Do | do | Nickel formate | do | violet | |
| Do | do | Va(SCN)$_3$ | do | red-violet | |
| Do | 3-Hydroxy-3'-chlorodiphenylamine | Ni(SCN)$_2$ | do | violet | |
| Do | do | Co(SCN)$_2$ | do | dull violet | |
| Do | do | Fe(SCN)$_3$ | do | brown | |
| Do | do | Copper-3-phenyl-salicylate | do | violet | |
| Do | 3-Hydroxy-2'-chlorodiphenylamine | Ni(SCN)$_2$ | do | do | red |
| Do | do | Co(SCN)$_2$ | do | dull violet | |
| Do | do | Cr(SCN)$_3$ | do | bordeaux | |
| Do | do | Fe(SCN)$_3$ | do | brown | |
| 6-Methoxy | 3-Hydroxydiphenylamine | Ni(SCN)$_2$ | do | navy blue | violet |
| Do | do | Co(SCN)$_2$ | do | do | |
| Do | 3-Hydroxy-4'-methoxydiphenylamine | Ni(SCN)$_2$ | pink | blue | |
| Do | do | Co(SCN)$_2$ | do | do | |
| Do | do | Fe(SCN)$_3$ | do | brown | |
| 6-N-Ethylsulfonamido | 3-Hydroxy-3'-chlorodiphenylamine | Ni(SCN)$_2$ | tan | do | |
| Do | do | Co(SCN)$_2$ | do | do | |
| 6-Cyano | 3-Hydroxydiphenylamine | Ni(SCN)$_2$ | | | |
| Do | do | Co(SCN)$_2$ | | | |
| 6-Thiocyano | do | Ni(SCN)$_2$ | pink | brown | |
| Do | do | Co(SCN)$_2$ | do | do | |
| 4,7-Dimethoxy | 3-Hydroxy-4'-methoxydiphenylamine | Ni(SCN)$_2$ | do | violet | |
| Do | do | Co(SCN)$_2$ | do | do | |
| 6-Trifluoromethyl | 3-Hydroxy-4'-methyldiphenylamine | Ni(SCN)$_2$ | do | do | |
| Do | do | Co(SCN)$_2$ | do | do | |
| 6-Chloro | 3-Hydroxy-2'-chlorodiphenylamine | Ni(SCN)$_2$ | do | do | |
| Do | do | Fe(SCN)$_2$ | do | brown | |
| 6-Methyl | 3-Hydroxydiphenylamine | Ni(SCN)$_2$ | do | violet | |
| 6-β-Hydroxyethyl | 3-Hydroxy-3'-chlorodiphenylamine | Ni(SCN)$_2$ | do | brown | |
| 6-Nitro | 3-Hydroxy-4'-methoxydiphenylamine | Ni(SCN)$_2$ | do | do | |
| Do | do | Co(SCN)$_2$ | do | do | |
| 6-Methylsulfonyl | N-β-Cyanoethyl-3-hydroxydiphenylamine | Ni(SCN)$_2$ | red | violet | red-violet |
| Do | do | Co(SCN)$_2$ | do | do | |
| 4-Methoxy | 3-Hydroxydiphenylamine | Ni(SCN)$_2$ | orange | brown | |
| Do | do | Co(SCN)$_2$ | do | do | |
| No substituent | 3-Methoxy-N-methyldiphenylamine | Ni(SCN)$_2$ | red | maroon | red |
| Do | do | Co(SCN)$_2$ | do | do | |
| Do | 3-Hydroxy-3'-methyldiphenylamine | Ni(SCN)$_2$ | do | blue | |
| Do | do | Co(SCN)$_2$ | do | do | |
| Do | 3-Hydroxy-4'-methyldiphenylamine | Ni(SCN)$_2$ | do | do | |
| Do | do | Co(SCN)$_2$ | do | do | |
| 6-Methoxy | 3-Methoxydiphenylamine | Ni(SCN)$_2$ | do | violet | Do. |
| Do | do | Co(SCN)$_2$ | do | do | |
| Do | 3-Methoxy-N-β-hydroxyethyldiphenylamine | Ni(SCN)$_2$ | do | do | |
| Do | do | Co(SCN)$_2$ | do | do | |
| Do | 3-β-Hydroxyethoxy-N-β-hydroxyethyl-4'-methoxydiphenylamine | Ni(SCN)$_2$ | do | maroon | red-violet |
| Do | do | Co(SCN)$_2$ | do | do | |
| Do | 3-Hydroxy-3'-methyldiphenylamine | Ni(SCN)$_2$ | do | blue | |
| Do | do | Co(SCN)$_2$ | do | do | |
| Do | 3-β-Hydroxyethoxy-N-β-hydroxyethyl-2'-chlorodiphenylamine | Ni(SCN)$_2$ | do | do | |
| Do | do | Co(SCN)$_2$ | do | do | |
| Do | 3-Hydroxy-N-β-hydroxyethyldiphenylamine | Ni(SCN)$_2$ | do | violet | red |
| 6-Ethoxy | 3-Hydroxy-N-β-hydroxyethyl-2'-chlorodiphenylamine | Ni(SCN)$_2$ | do | brown | Do. |
| Do | do | Co(SCN)$_2$ | do | do | |
| Do | 3-Hydroxydiphenylamine | Ni(SCN)$_2$ | do | blue | |
| Do | do | Co(SCN)$_2$ | do | do | |
| Do | 3-Methoxy-N-β-cyanoethyldiphenylamine | Ni(SCN)$_2$ | do | maroon | Do. |
| Do | do | Co(SCN)$_2$ | do | do | |
| 6-Nitro | 3-Hydroxy-4'-methoxy-N-β-hydroxy-ethyldiphenylamine | Ni(SCN)$_2$ | red-violet | violet | red-violet |
| Do | do | Co(SCN)$_2$ | do | do | |
| Do | 3-Hydroxy-N-β-hydroxyethyldiphenylamine | Ni(SCN)$_2$ | do | do | Do. |

| 2-Aminobenzothiazole Compound | Coupling Component | Metallizing Agent | Color on CA Original | Color on CA Final | Color on Acrylonitrile Graft Polymer Original |
|---|---|---|---|---|---|
| Do | do | Co(SCN)₂ | do | do | |
| Do | 3-Methoxydiphenylamine | Ni(SCN)₂ | red | do | |
| Do | do | Co(SCN)₂ | do | do | |
| 5,6-Dimethoxy | 3-Hydroxy-4'-methoxydiphenylamine | Ni(SCN)₂ | do | blue | Do. |
| Do | do | Co(SCN)₂ | do | do | |
| Do | 3-Hydroxydiphenylamine | Ni(SCN)₂ | do | do | |
| Do | do | Co(SCN)₂ | do | do | |
| Do | 3-Methoxy-N-β-hydroxyethyldiphenylamine | Ni(SCN)₂ | do | maroon | Do. |
| Do | do | Co(SCN)₂ | do | do | |
| Do | 3-Hydroxydiphenylamine | Ni(SCN)₂ | do | blue | |
| 6-Methylsulfonyl | do | Co(SCN)₂ | do | do | |
| Do | 3-Hydroxy-N-β-hydroxyethyl-2'-methoxydiphenylamine | Ni(SCN)₂ | do | violet | Do. |
| Do | do | Co(SCN)₂ | do | do | |
| Do | 3-Hydroxy-N-β-hydroxyethyl-2'-chlorodiphenylamine | Ni(SCN)₂ | do | brown | red. |
| 6-Nitro | do | Co(SCN)₂ | do | do | |
| Do | do | Ni(SCN)₂ | do | maroon | |
| Do | 3-Methoxy-N-β-hydroxyethyldiphenylamine | Co(SCN)₂ | do | do | |
| Do | do | Ni(SCN)₂ | red-violet | violet | |
| Do | 3-Hydroxydiphenylamine | Co(SCN)₂ | do | do | |
| Do | do | Ni(SCN)₂ | red | do | |
| No substituent | 3-Hydroxy-N-β-hydroxyethyldiphenylamine | Co(SCN)₂ | do | do | |
| Do | do | Ni(SCN)₂ | do | maroon | Do. |
| 6-Nitro | 3-Hydroxy-N-β-hydroxyethyl-2'-chlorodiphenylamine | Co(SCN)₂ | do | do | |
| Do | do | Ni(SCN)₂ | do | violet | |
| 6-Methylsulfonyl | 3-Methoxy-2'-chlorodiphenylamine | Co(SCN)₂ | do | do | |
| Do | do | Ni(SCN)₂ | do | do | Do. |
| Do | 3-Methoxydiphenylamine | Co(SCN)₂ | do | do | |
| Do | do | Ni(SCN)₂ | do | do | Do. |
| Do | 3-Hydroxy-N-β-hydroxyethyldiphenylamine | Co(SCN)₂ | do | do | |
| Do | do | Ni(SCN)₂ | do | do | |
| 4,6-Dimethyl | do | Co(SCN)₂ | do | do | |
| Do | do | Ni(SCN)₂ | scarlet | red | |
| Do | 3-Hydroxy-2'-chlorodiphenylamine | Co(SCN)₂ | do | do | |
| Do | do | Ni(SCN)₂ | do | maroon | |
| Do | 3-β-Hydroxyethoxy-N-β-hydroxyethyldiphenylamine | Co(SCN)₂ | do | do | |
| Do | do | Ni(SCN)₂ | do | red | |
| 6-Acetylamino | 3-Methoxydiphenylamine | Co(SCN)₂ | do | do | |
| Do | do | Ni(SCN)₂ | do | red-violet | |
| 6-Methyl | 3-Hydroxy-2'-chlorodiphenylamine | Co(SCN)₂ | do | do | |
| Do | do | Ni(SCN)₂ | do | violet | |
| Do | 3-Hydroxy-4'-methoxydiphenylamine | Co(SCN)₂ | do | do | |
| Do | do | Ni(SCN)₂ | red | do | |
| 4,6-Dimethyl | 3-Hydroxydiphenylamine | Co(SCN)₂ | do | do | |
| Do | do | Ni(SCN)₂ | scarlet | do | |
| 4,7-Dimethoxy | 3-Hydroxy-N-β-hydroxyethyldiphenylamine | Co(SCN)₂ | do | do | |
| Do | do | Ni(SCN)₂ | do | do | |
| Do | 3-Hydroxydiphenylamine | Co(SCN)₂ | do | do | |
| Do | do | Ni(SCN)₂ | do | do | |
| 6-Cyano | 3-Hydroxy-N-β-hydroxyethyldiphenylamine | Co(SCN)₂ | do | do | |
| Do | do | Ni(SCN)₂ | do | brown | |
| 6-Methylsulfonyl | 3-Methoxy-4'-methyldiphenylamine | Co(SCN)₂ | do | do | |
| Do | do | Ni(SCN)₂ | pink | violet | |
| Do | 3-Hydroxy-4'-methyldiphenylamine | Co(SCN)₂ | do | do | |
| Do | do | Ni(SCN)₂ | do | do | |
| Do | 3-Hydroxy-3'-methyldiphenylamine | Co(SCN)₂ | do | do | |
| Do | do | Ni(SCN)₂ | do | do | |
| Do | 3-Hydroxy-2'-methyldiphenylamine | Co(SCN)₂ | do | do | |
| Do | do | Ni(SCN)₂ | do | do | |
| Do | 3-Methoxy-3'-methyldiphenylamine | Co(SCN)₂ | do | do | |
| Do | do | Ni(SCN)₂ | do | do | |
| Do | 3-Methoxy-N-β-hydroxyethyldiphenylamine | Co(SCN)₂ | do | do | |
| Do | do | Ni(SCN)₂ | red | blue | |
| 6-β-Hydroxyethyl | 3-Hydroxy-4'-methoxydiphenylamine | Co(SCN)₂ | do | do | |
| Do | do | Ni(SCN)₂ | do | navy | |
| Do | 3-Hydroxy-2'-methoxydiphenylamine | Co(SCN)₂ | do | do | |
| Do | do | Ni(SCN)₂ | do | blue-violet | |
| Do | 3-Hydroxy-3'-methyldiphenylamine | Co(SCN)₂ | do | do | |
| Do | do | Ni(SCN)₂ | do | navy | |
| Do | 3-Hydroxy-2'-methyldiphenylamine | Co(SCN)₂ | do | do | |
| Do | do | Ni(SCN)₂ | do | do | |
| Do | 3-Hydroxy-2'-methoxy-N-β-hydroxyethyldiphenylamine | Co(SCN)₂ | do | do | |
| Do | do | Ni(SCN)₂ | do | violet | red-violet. |
| Do | 3-Hydroxy-3'-chlorodiphenylamine | Co(SCN)₂ | do | do | |
| Do | do | Ni(SCN)₂ | do | navy | Do. |
| Do | 3-Hydroxy-4'-methyldiphenylamine | Co(SCN)₂ | do | do | |
| Do | do | Ni(SCN)₂ | do | blue-violet | |
| Do | 3-Hydroxy-N-β-cyanoethyldiphenylamine | Co(SCN)₂ | do | do | |
| Do | do | Ni(SCN)₂ | do | violet | |
| Do | do | Co(SCN)₂ | do | do | |

*Preparation of acrylonitrile graft polymer*

3.0 g. of acrylonitrile and 7.0 g. of N-methyl methacrylamide were emulsified in 40 cc. of water containing 0.15 g. of potassium persulfate and 0.01 g. of tertiary dodecyl mercaptan. The emulsion was heated at 60° C. until 94% or more of the monomers had copolymerized. This result is usually accomplished by heating for about 12 hours. The copolymer contained approximately 30% by weight of acrylonitrile and 70% by weight of N-methyl methacrylamide. The mixture was then cooled to room temperature, 50 cc. of water added and the mixture agitated until a homogeneous solution of dope containing 10% by weight of the copolymer resulted.

30.7 g. (3.07 g. of copolymer) of the above prepared solution or dope of the copolymer were placed in a jacketted reactor provided with an agitator and heat exchanger. There were then added 10 g. of acrylonitrile, 114 cc. of water, 0.58 g. of 85% phosphoric acid, 0.1 g. of potassium persulfate, 0.17 g. of potassium metabisulfite, 0.1 g. of tertiary dodecyl mercaptan and 0.56 g. of a 30% solution in water of N-methyl methacrylamide and the mixture heated, with stirring, to 35° C. and then allowed to level off at 37°–39° C. After the heat of polymerization had been removed and when the conversion of the acrylonitrile to polymer had reached 96% or more, which is usually accomplished in a period of about 12 hours, the temperature was raised to 90° C. The mother liquor was removed by centrifuging the polymerization mixture, the polymer precipitate being reslurried twice with water and centrifuged to a 70% moisture cake. The cake was dried under vacuum at 80° C. in an agitated dryer. The overall yield of modified polyacrylonitrile product was over 90%. After hammermilling, the dry powder, now ready for spinning, was stored in a moisture proof container.

The acrylonitrile graft polymer prepared as above and containing about 18% by weight of N-methyl methacrylamide was soluble in N,N-dimethylformamide. Fibers spun by extruding a solution of the polymer product in N,N-dimethylformamide into a precipitating bath had a softening temperature of about 240° C., an extensibility of about 20–30 percent depending on the drafting and relaxing conditions, and showed excellent affinity for dyes.

In order that the preparation of the azo compounds of our invention may be entirely clear, the preparation of certain intermediates used in their manufacture is described hereinafter.

*Preparation of 2-amino-6-methylsulfonylbenzothiazole*

A solution of 200 parts of bromine in 300 parts of acetic acid was added over the course of about 1 hour to a mixture of 171 parts of p-aminophenylmethylsulfone and 202 parts of sodium thiocyanate in 1750 parts of acetic acid. The temperature was held below 35° C. during the addition and after complete addition of the bromine-acetic acid mixture, the reaction mixture was stirred for 18 hours. The reaction product was recovered on the filter by filtration, washed with acetic acid and then dispersed in 6000 parts of water. The reaction mixture thus obtained was heated to boiling and then an alkali such as caustic soda or sodium carbonate was added until the pH of the reaction mixture was about 6. The reaction mixture was then cooled, filtered and the reaction product which collected on the filter was washed well with water and dried at 120° C. 145 to 160 parts of 2-amino-6-methylsulfonylbenzothiazole were obtained as light yellow crystals melting at 226° C.–228° C.

*Preparation of 2-acetylamino-6-thiocyanobenzothiazole*

To a solution of 18.6 parts of aniline and 30.4 parts of ammonium thiocyanate in 300 parts of acetic acid at 15° C. 14.2 parts of chlorine were bubbled in at 15° C.–17° C. 30 minutes after addition of the chlorine 15.6 parts of sodium acetate and 30.4 parts of ammonium thiocyanate were added to the reaction mixture. While holding the temperature of the reaction mixture below 35° C., 14.2 parts of chlorine were passed in and the reaction mixture was stirred overnight at room temperature. The solid present in the reaction mixture was recovered by filtration, washed with 50 parts of acetic acid and then suspended in 600 parts of water. The mixture thus obtained was heated to boiling and filtered. 30 parts of sodium acetate were added to the filtrate and the solid which precipitated was collected at 70° C. on a filter, washed with 200 parts of cold water and dried at 100° C. 30 parts of a product melting at 187° C.–188° C. were thus obtained.

30 parts of acetic anhydride were added at 80° C. to a solution of 52.6 parts of the above product in 81 parts of acetic acid, and the temperature of the reaction mixture was held at 80° C.–90° C. for one hour. The reaction mixture was then poured into 1000 parts of cold water and the product which precipitated was recovered by filtration, washed with 500 parts of water and then dried at 60° C. 62 parts of 2-acetylamino-6-thiocyanobenzothiazole melting at 247° C.–249° C. were thus obtained.

*Preparation of 2-amino-6-ethylsulfonylbenzothiazole*

A solution of 26.4 parts of crystalline sodium sulfide and 24.9 parts of 2-acetylamino-6-thiocyanobenzothiazole in 150 parts of ethylalcohol were refluxed together for 10 minutes and after cooling the reaction mixture to 20° C., 16.3 parts of ethyl iodide were added at one time and the reaction mixture resulting was refluxed for one hour. The reaction mixture was then poured into 1000 parts of water and the product which precipitated was recovered by filtration, washed well with water and dried at 60° C. 23.6 parts of 2 - acetylamino - 6 - ethylthiobenzothiazole melting at 168° C.–169° C. were obtained. If desired, the quality of the product can be checked by hydrolyzing a little of the product with acid to 2-amino-6-ethylthiobenzothiazole melting at 137° C.–139° C.

19 parts of 30% aqueous hydrogen peroxide were added to a solution of 15.5 parts of 2-acetylamino-6-ethylthiobenzothiazole in 53 parts of acetic acid while maintaining the temperature of the reaction mixture between 80° C.–90° C. The reaction mixture was maintained at this temperature for one hour and then poured into 500 parts of cold water. The solid present in the reaction mixture was recovered by filtration and then suspended in a mixture of 800 parts of water and 100 parts of concentrated hydrochloric acid. The reaction mixture thus obtained was heated to boiling and then filtered. The filtrate was neutralized with sodium acetate, cooled to 25° C. and filtered. The product collected on the filter was washed with cold water and dried at 60° C. 8.5 parts of 2-amino-6-ethylsulfonylbenzothiazole melting at 173° C.–175° C. were thus obtained.

*Preparation of 2-amino-6-isopropylsulfonylbenzothiazole*

This compound was prepared in accordance with the procedure described for the preparation of 2-amino-6-ethylsulfonylbenzothiazole using 17.76 parts of isopropyl iodide in place of ethyl iodide. The melting point of the 2-acetylamino-6-isopropylthiobenzothiazole formed during the process was 174° C.–175° C. while that of the final product 2-amino-6-isopropylsulfonylbenzothiazole was 207° C.–209° C.

2-amino-6 - n - propylsulfonylbenzothiazole is similarly prepared by the use of 17.76 parts of n-propyl iodide in place of isopropyl iodide in the foregoing example.

*Preparation of 2-amino-6-isobutylsulfonylbenzothiazole*

This compound was prepared in accordance with the procedure described for the preparation of 2-amino-6-ethylsulfonylbenzothiazole using 14.3 parts of isobutyl bromide in place of ethyl iodide. The melting point of the 2-acetylamino-6-isobutylthiobenzothiazole obtained was 167° C.–168° C. while that of the final product 2-amino-6-isobutylsulfonylbenzothiazole was 206° C.–207° C.

2-amino-6-n-butylsulfonylbenzothiazole is similarly prepared by using 14.3 parts of n-butyl bromide in place of isobutyl bromide in the foregoing example.

*Preparation of 2-amino-6-trifluoromethylsulfonylbenzothiazole*

75 parts of bromine in 120 parts of acetic acid were added gradually with stirring to a solution of 98 parts of p-aminophenyltrifluoromethylsulfone and 76 parts of sodium thiocyanate in 700 parts of acetic acid. The addition of the bromine was begun at room temperature and the temperature of the reaction mixture was kept below 35° C. during the addition. The temperature ordinarily rises to about 32° C. The reaction mixture resulting was stirred for 24 hours at room temperature following which it was poured into 5000 parts of cold water and the mineral acid therein neutralized by the addition of sodium acetate with good stirring. The product which formed was recovered by filtration, washed well with cold water and dried at 110° C. 33 to 70 parts of 2-amino-6-trifluoromethylsulfonylbenzothiazole melting at 206–208° C. were thus obtained.

*Preparation of 2-amino-6-trifluoromethylbenzothiazole*

12.5 parts of bromine in 20 parts of acetic acid were added dropwise, with stirring, to a solution of 12.4 parts of p-aminobenzotrifluoride and 12.7 parts of sodium thiocyanate in 115 parts of acetic acid while maintaining the temperature of the reaction mixture below 35° C. The reaction mixture resulting was stirred for 12 hours following which the solid present therein was removed by filtration. The filtrate was poured into 1000 parts of water and the mineral acid therein was neutralized by the addition of sodium acetate with good agitation. The product which formed was recovered by filtration, washed well with cold water and dried under vacuum at 45° C. 7.7–10.2 parts of 2-amino-6-trifluoromethylbenzothiazole melting at 115.5–116.5° C. were thus obtained.

*Preparation of 2-amino-6-β-hydroxyethylbenzothiazole*

255.7 grams of bromine in 400 cc. of acetic acid were added gradually over a period of 1 hour with good stirring to a solution of 219.2 grams of p-aminophenylethyl alcohol and 259.2 grams of sodium thiocyanate in 2400 cc. of acetic acid while maintaining the temperature of the reaction mixture below 15° C. The reaction mixture resulting was stirred for 2 hours at 10° C.– 12° C. and the product which formed was recovered on the filter by filtration and washed with 300 cc. of acetic acid. The product filter cake thus obtained was dissolved in 1600 cc. of water at about 40° C. and the reaction mixture was made alkaline by the addition of sodium hydroxide. The reaction mixture thus obtained was heated to boiling and then cooled to 15° C. and filtered. The product obtained on the filter was washed with water until neutral and then dried at 100° C. 206 to 230 grams of 2-amino-6-β-hydroxyethylbenzothiazole were thus obtained in the form of white crystals melting at 175° C.–177° C.

Another alkali metal thiocyanate such as potassium thiocyanate, for example, can be used in place of sodium thiocyanate in the foregoing examples. Similarly, another alkaline agent, such as sodium carbonate, sodium bicarbonate, potassium carbonate, potassium bicarbonate, ammonium acetate or potassium acetate, for example, can be used to neutralize the mineral acid in place of sodium acetate.

The preparation of p-aminophenyltrifluoromethylsulfone is described in British Patent 485,592.

The non-metallized monoazo dye compounds of our invention can be applied to cellulose alkyl carboxylic acid esters having 2 to 4 carbon atoms in the acid groups thereof, nylon, an acrylonitrile polymer, such as polyacrylonitrile and acrylonitrile graft polymers, and polyester, such as polyethylene terephthalate, textile materials and the metallized azo dye compounds of our invention can be applied to nitrogenous textile materials such as, for example, wool, silk, nylon and acrylonitrile polymers, such as polyacrylonitrile and acrylonitrile graft polymers, in the form of an aqueous dispersion and are ordinarily so applied.

To illustrate, the dye compound is finely ground with a dispersing agent such as sodium lignin sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dye bath, washed with an aqueous soap solution, rinsed well with water and dried. In the case of certain of the acrylonitrile graft polymers described hereinbefore it is necessary to dye at the boil for an extended period of time. Instances may be encountered where the fiber is not satisfactorily colored by the dyeing procedure just described. In these instances special dyeing techniques, such as the use of pressure, for example, developed by the art for the coloration of materials difficult to color may be employed.

Widely varying amounts of dye can be used in the dyeing operation. The amount of dye used can be, for example, ⅓ to 3% (by weight) of that of the textile material although lesser or greater amounts of the dye can be employed.

The following example illustrates one satisfactory way in which the fibers of the acrylonitrile graft polymers can be dyed using either the non-metallized or metallized azo compounds of our invention. 16 milligrams of dye are ground with an aqueous solution of sodium lignin sulfonate until well dispersed or alternately the dye can be dissolved in 5 cc. of hot Cellosolve. The dispersion or solution, as the case may be, is then poured into 150 cc. of water to which a small amount of a surface-active agent such as Igepon T ($C_{17}H_{33}.CO.N(CH_3).C_2H_4SO_3Na$), Nekal BX (sodium alkylnaphthalenesulfonate) or Orvus (sodium lauryl sulfate-type) has been added. The dye bath is then brought to the desired temperature and 5 grams of well wet-out fibers of the graft polymer are added thereto. Dyeing is continued until the proper shade is reached. From time to time throughout the dyeing operation, the material is worked to promote even dyeing.

The expression "propionic-acetic (1:5) acids" refers to a mixture of propionic and acetic acids in which there are five parts by volume of acetic acid to 1 part by volume of propionic acid.

The non-metallized azo compounds dye nylon substantially the same shade as they dye acrylonitrile polymers.

Acrylonitrile graft polymers including those of the type specifically described hereinbefore are described and claimed in Coover U. S. application Serial No. 408,012, filed February 3, 1954. 2-amino-6-trifluoromethylsulfonylbenzothiazole is described and claimed by Straley and Fisher U. S. application Serial No. 413,954, filed March 3, 1954, now abandoned. 2-amino-6-trifluoromethylbenzothiazole is described and claimed by Straley and Fisher U. S. application Serial No. 413,955, filed March 3, 1954, now abandoned.

We claim:

1. As a composition of matter, the azo compounds selected from the group consisting of the monoazo compounds and their metal complexes containing a metal selected from the group consisting of chromium, cobalt, copper, iron, manganese, nickel and vanadium, said monoazo compounds having the formula:

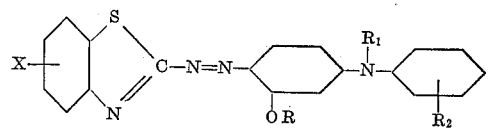

wherein X represents a member selected from the group consisting of a hydrogen atom, an alkylsulfonyl group having 1 to 4 carbon atoms, an N-alkylsulfonamide group having 1 to 4 carbon atoms, an alkoxy group having 1 to 4 carbon atoms, an alkyl group having 1 to 4 carbon atoms, a hydroxyalkyl group having 2 to 4 carbon atoms, an acetylamino group, a propionylamino group, a butyrylamino group, a thiomethyl group, a thiocyano group, a cyano group, a trifluoromethyl group, a chlorine atom and a nitro group, R represents a member selected from the group consisting of a hydrogen atom, an alkyl group having 1 to 4 carbon atoms and a β-hydroxyethyl group, $R_1$ represents a member selected from the group consisting of a hydrogen atom, a hydroxyalkyl group having 2 to 4 carbon atoms, an alkyl group having 1 to 4 carbon atoms and a cyanoalkyl group having 3 to 4 carbon atoms and $R_2$ represents a member selected from the group consisting of a hydrogen atom, a hydroxy group, an alkoxy group having 1 to 4 carbon atoms, an alkyl group having 1 to 4 carbon atoms and a chlorine atom.

2. As a composition of matter, the metallizable monoazo compounds defined in claim 1.
3. As a composition of matter, the metallized azo compounds defined in claim 1.
4. As a composition of matter, the nickel complex of the monoazo compounds defined in claim 1.
5. As a composition of matter, the cobalt complex of the monoazo compounds defined in claim 1.
6. As a composition of matter, the nickel complex of the monoazo compounds defined in claim 1 wherein R represents a hydrogen atom, $R_1$ represents a β-hydroxyethyl group and $R_2$ represents a hydrogen atom.
7. As a composition of matter, the nickel complex of the monoazo compounds defined in claim 1 wherein R represents a methyl group, $R_1$ represents a β-hydroxyethyl group and $R_2$ represents a hydrogen atom.
8. As a composition of matter, the nickel complex of the monoazo compounds defined in claim 1 wherein R, $R_1$ and $R_2$ each represents a hydrogen atom.
9. A complex nickel compound of the azo compound having the formula:

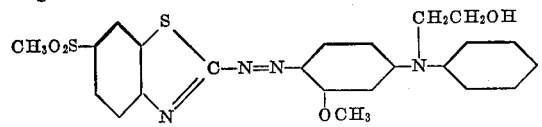

10. A complex nickel compound of the azo compound having the formula:

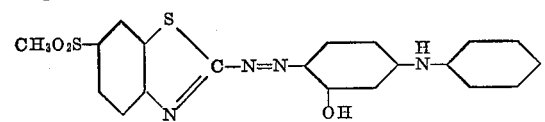

11. A complex nickel compound of the azo compound having the formula:

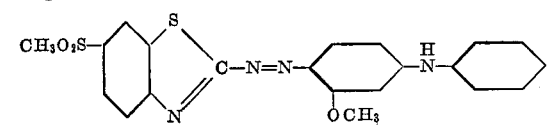

12. A complex nickel compound of the azo compound having the formula:

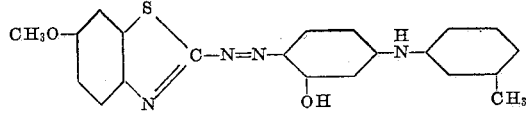

13. A complex nickel compound of the azo compound having the formula:

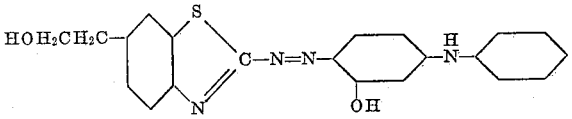

14. The azo compound having the formula:

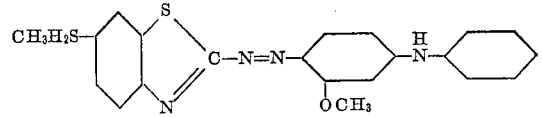

15. The azo compound having the formula:

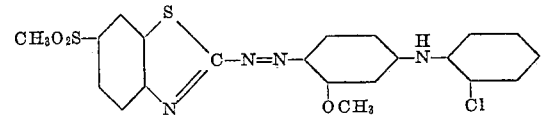

16. The azo compound having the formula:

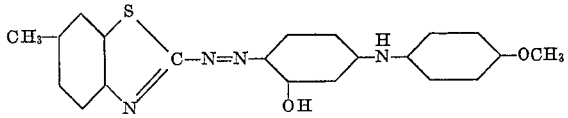

17. The azo compound having the formula:

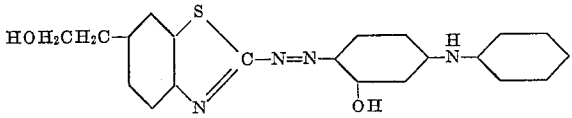

18. The azo compound having the formula:

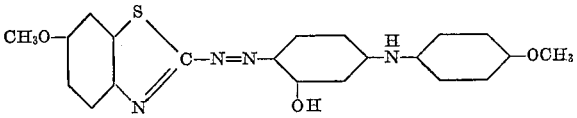

References Cited in the file of this patent

UNITED STATES PATENTS

| | | |
|---|---|---|
| 1,853,418 | Hentrich | Apr. 12, 1932 |
| 2,109,552 | Schindhelm et al. | Mar. 1, 1938 |
| 2,206,885 | Dickey | July 9, 1940 |
| 2,374,106 | Kvalnes | Apr. 17, 1945 |
| 2,390,480 | West | Dec. 4, 1945 |
| 2,441,612 | Argyle et al. | May 18, 1948 |
| 2,683,709 | Dickey et al. | July 13, 1954 |
| 2,686,177 | Gunst | Aug. 10, 1954 |

UNITED STATES PATENT OFFICE
CERTIFICATE OF CORRECTION

Patent No. 2,857,371                              October 21, 1958

James M. Straley et al.

It is hereby certified that error appears in the printed specification of the above numbered patent requiring correction and that the said Letters Patent should read as corrected below.

Column 3, line 2, for "acetate" read -- bromide --; column 5, line 40, strike out "27.75 parts of" and insert the same after "solution of" in line 39, same column; column 7, line 25, for "N-methylmethacrylamine" read -- N-methylmethacrylamide --; column 20, line 18, claim 14, for the left-hand portion of the formula reading "$CH_3H_2S-$" read -- $CH_3O_2S-$ --.

Signed and sealed this 3rd day of March 1959.

(SEAL)
Attest:

KARL H. AXLINE                                          ROBERT C. WATSON
Attesting Officer                                     Commissioner of Patents